Dec. 13, 1932.  D. A. WALSH  1,890,632
SUGAR CRYSTALLIZER
Filed Jan. 29, 1929
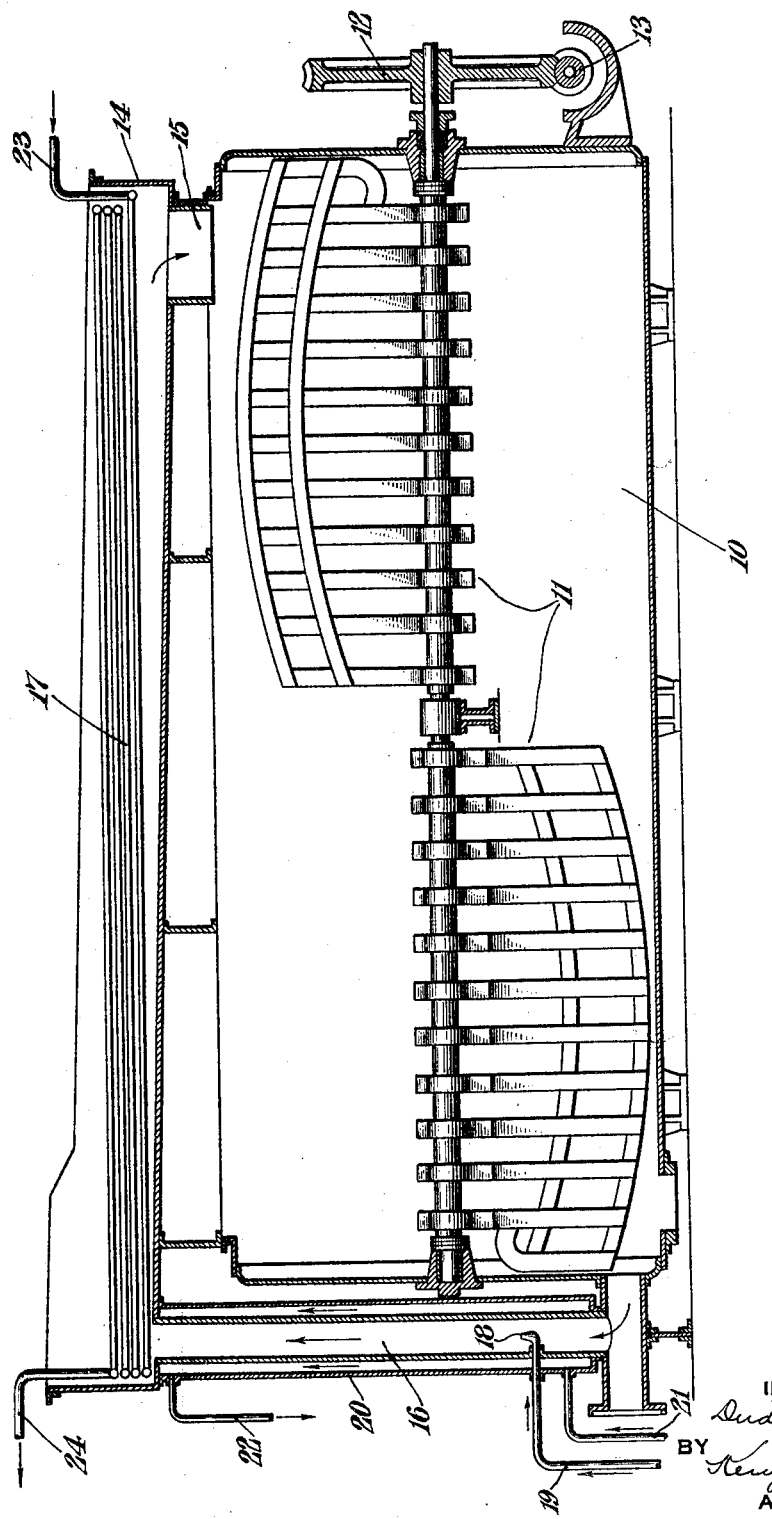
INVENTOR
Dudley A. Walsh
BY
Kenyon & Kenyon
ATTORNEY Patented Dec. 13, 1932

1,890,632

UNITED STATES PATENT OFFICE

DUDLEY A. WALSH, OF NEW ORLEANS, LOUISIANA

SUGAR CRYSTALLIZER

Application filed January 29, 1929. Serial No. 335,958.

This invention relates to sugar crystallizers and has for an object an improved and inexpensive cooling system for such crystallizers, by means of which the massecuite may be efficiently and quickly cooled during crystallization.

According to this invention, a sloping trough is provided above the crystallizing tank and communicates at its lower end with the upper portion of the tank. A conduit leads from the bottom of the crystallizing tank to the high end of the trough, and within the conduit there is provided an upwardly directed air jet, by means of which massecuite is lifted through the conduit into the trough. Within the trough there is provided a heat exchange device preferably consisting of a plurality of spaced horizontal pipes. A jacket surrounds the conduit and means are provided for supplying either a heating or a cooling fluid to said jacket. Massecuite from the bottom of the tank is lifted through the conduit into the trough above the level of the heat exchange device and flows along the trough to the lower end thereof where it drains back into the trough. In passing through the trough, the massecuite flows transversely as well as longitudinally of the pipes of the heat exchange device, thus resulting in bringing fresh portions of the massecuite into contact with the pipes thereby displacing the portion previously in contact therewith and thus rendering very efficient the action of the heat exchange device.

Other objects, novel features and advantages of this invention will be apparent from the following specification and appended drawing, wherein the single figure is a vertical section through the crystallizer embodying the invention.

In the drawing, 10 designates a tank within which is rotatably mounted an agitator 11, the shaft of which extends through one end of the tank and is provided with a worm wheel 12 which meshes with a worm 13 on a drive shaft. The agitator 11 stirs the massecuite in the tank and brings each individual grain of sugar into contact with the maximum quantity of mother liquid, thus promoting the growth of the sugar grains.

A trough 14 is supported above the tank 10. The bottom of this trough is made sloping and at its lower end communicates with the upper portion of the tank through conduit 15. A conduit 16 leads from the lower portion of the tank 10 to the high end of the bottom of the trough 14. Within the trough 14 is provided a heat exchange device 17 which preferably consists of a plurality of horizontal pipes extending longitudinally of the trough.

An upwardly directed air jet 18 is arranged in the conduit 16 near the bottom thereof and is provided with a supply pipe 19. A jacket 20 surrounds the conduit 16 and is provided with an inlet pipe 21 and an outlet pipe 22. The jet 18 and the conduit 16 form an air lift by means of which massecuite is lifted from the bottom of the tank 10 into the trough 14, compressed air being supplied to the jet 18 through the pipe 19 from any suitable source.

While the crystallization of the sugar is being effected by the agitator 11, the massecuite is cooled by being drawn out of the bottom of the tank, passed up through the air lift into the trough 14 through which it flows and drains back into the tank through the conduit 15. In its passage through the trough 14, the massecuite comes in contact with the pipes 17. A cooling fluid is circulated through the pipes of the heat exchanger, this fluid being introduced into the inlet pipe 23 and discharged through the outlet pipe 24. The force of the air lift is such that the massecuite is carried above the level of the pipes constituting the heat exchange device and the massecuite in flowing from the high end of the trough passes transversely of the pipes as well as longitudinally, this being due to the fact that the pipes are horizontally arranged. By this arrangement of the pipes of the heat exchange device, parallel flow of the massecuite with respect to the pipes is avoided. This prevents the formation of an extremely slow moving layer of massecuite around the pipes, thus insulating the same, and preventing proper contact between the pipes and the remainder of the massecuite flowing more rapidly in the spaces between the pipes and without coming into contact therewith. Such parallel flow would render the heat exchanger quite inefficient but is avoided by the arrangement above described.

The compressed air which is supplied to the jet 18 through the tube 19 may be cooled before reaching the jet 18 and will be quite efficient in carrying away heat from the massecuite lifted through the conduit 16. During the operation of the apparatus a cooling fluid is supplied to the jacket 20 by the pipe 21 and drains therefrom by the pipe 22, this cooling fluid serving to assist in the absorption of heat from the massecuite.

After the massecuite has been sufficiently cooled to a temperature of say 100° F. it becomes very viscous, attaining a semi-solid condition and if discharged to the next step of the process, which is the centrifugal station, it would be very difficult for the centrifugal machines to separate the molasses, or mother liquid, from the crystals. To prevent the loss in centrifugal capacity, which would thus result, it is necessary that the massecuite be again heated to reduce its viscosity. As the crystals have been formed during the cooling process by growth of the original crystals which entered the crystallizer by adsorption of sucrose from the mother liquid, this reheating will not, in any way vitiate the advantage gained by cooling for the reason that the reheating is carried only to a temperature of about 114° F. which temperature has been found low enough to avoid melting of the crystals previously formed while at the same time allowing free purging of the massecuite in the centrifugal station. The heating of the massecuite above referred to is effected by supplying heated air to the jet 18 as well as supplying heated fluid, both to the jacket 20 and to the heat exchange device 17. In this way, the temperature of the massecuite can be quickly and easily raised to render it sufficiently fluid for the centrifugal operation.

The massecuite flowing in the trough 14 will dissipate heat directly from its upper surface which is exposed to the air as well as through the walls of the trough which will conduct heat to the surrounding air. The cooling of the massecuite or heating when desired, is speedily accomplished by the different agencies above pointed out. The apparatus constituting the cooling system may be in the nature of an auxiliary device to be added to existing crystallizers or may be incorporated in the design of new crystallizers. In any event, the same results that could be obtained by the conventional air cooled crystallizers will be obtained in a much shorter period of time. This will enable different crystallizers to handle a great quantity of massecuite in a given period of time with a consequent capacity increase. This capacity increase is obtained at a comparatively small expense as it is far cheaper to make use of the cooling arrangement above described than to add additional crystallizer capacity of the conventional air cooled type. The utilization of this apparatus to heat the massecuite at the end of the cooling period to render it more fluid enables the centrifugal machine to handle the massecuite directly from the crystallizer without dilution.

It is of course apparent that various modifications may be made in the structure above described without in any way departing from the spirit of the invention as defined in the appended claims.

I claim:

1. A sugar crystallizer comprising a tank, an agitator therein, a sloping trough supported above the tank and communicating at its lower end with said tank, a plurality of horizontal pipes therein, a conduit connecting the lower portions of said tank and the high end of said trough, and means for producing an upward draft of air in said conduit, a jacket surrounding said conduit and means for circulating fluid therethrough.

2. A sugar crystallizer comprising a tank, an agitator therein, a trough arranged above said tank and having a sloping bottom, a conduit leading from the lower portion of said tank into the high end of said trough, a plurality of horizontal pipes arranged in said trough to form a heat exchange device, and means for lifting fluid through said conduit into said trough, said trough being in communication with said tank at its low end, a jacket surrounding said conduit, and means for circulating fluid therethrough.

3. A sugar crystallizer comprising a tank, an agitator therein, a trough communicating at one end with the upper portion of said tank, a conduit leading from the lower portion of said tank to the other end of said trough, a heat exchange device in said trough, and means for producing an upward draft of air in said conduit to lift massecuite from the tank into said trough, a jacket surrounding said conduit and means for circulating fluid therethrough.

4. A sugar crystallizer comprising a tank, an agitator therein, a trough arranged above said tank and having a sloping bottom, a conduit leading from the lower portion of said tank into the high end of said trough, a plurality of horizontal pipes arranged in said trough to form a heat exchange device, and means for producing an upward draft of air in said conduit for lifting liquid from said tank into said trough, said trough being in communication with said tank at its low end, a jacket surrounding said conduit and means for circulating fluid therethrough.

5. A sugar crystallizer comprising a tank, an agitator therein, a sloping trough supported above the tank and communicating at its low end with said tank, a heat exchange device arranged in said tank, and means for lifting liquid from said tank into said trough and simultaneously effecting change of temperature of said liquid.

6. A sugar crystallizer comprising a tank, an agitator therein, a trough communicating at one end with said tank, a conduit leading from the lower portion of said tank to the other end of said trough, a heat exchange device in said trough, means for producing an upward draft of hot or cold air in said conduit to lift liquid from said tank into said trough, and means for effecting change of temperature in the liquid in said conduit.

7. A sugar crystallizer comprising a tank, an agitator therein, a trough communicating at one end with said tank, a conduit leading from the lower portion of said tank to the other end of said trough, a heat exchange device in said trough, means for producing an upward draft of hot or cold air in said conduit to lift liquid from said tank into said trough, a jacket surrounding said conduit, and means for supplying fluid to said jacket to effect change of temperature in the liquid in said conduit.

8. A sugar crystallizer comprising a tank, an agitator therein, a sloping trough supported above said tank and communicating therewith at its low end, a plurality of horizontal pipes arranged in said trough to form a heat exchange device, a conduit leading from the lower portion of said tank into the high end of said trough, an upwardly directed air jet in said conduit, means for supplying hot or cold air to said jet, a jacket surrounding said conduit, and means for circulating heating or cooling fluid through said jacket.

In testimony whereof, I have signed my name to this specification.

DUDLEY A. WALSH.